Patented Nov. 4, 1941

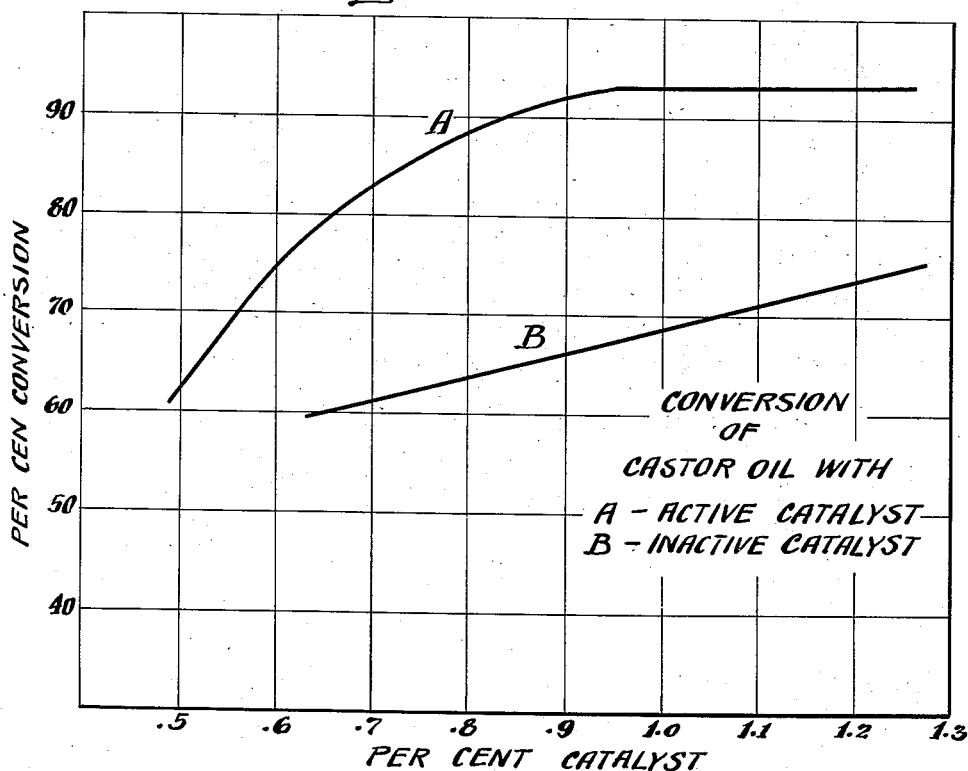
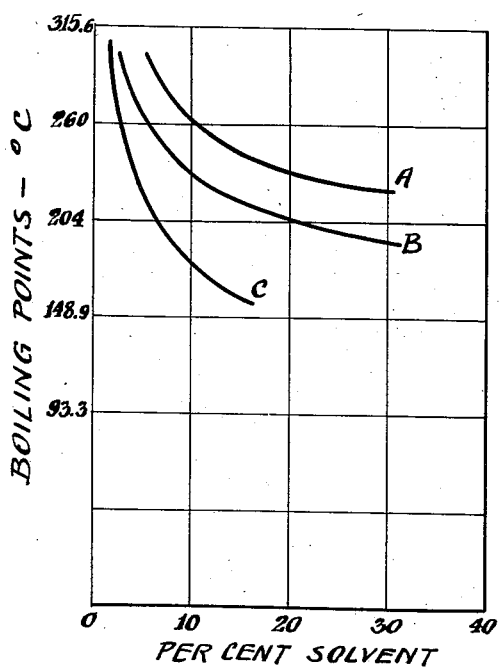

2,261,663

UNITED STATES PATENT OFFICE 2,261,663

DEHYDRATING CASTOR OIL

Alfred E. Rheineck and Samuel B. Crecelius, Louisville, Ky., assignors to Devoe & Raynolds Co., Inc., a corporation of New York Application August 19, 1939, Serial No. 291,002

3 Claims. (Cl. 260—398)

Our invention relates to catalysts suitable for converting castor oil or equivalent fatty oils having an hydroxyl group into drying oils such that they may be used in protective coatings. More particularly, the invention relates to the preparation and use of yellow tungstic acid catalyst for converting, through the intermediary of dehydration and oxidation processes, castor oil or the like into a drying oil similar in characteristics to China-wood oil. The invention is described below with particular reference to castor oil although it is to be understood that similar oils which are subject to conversion by the tungstic acid catalyst are included in our invention.

A feature of the invention is the preparation of yellow tungstic acid by a process adapted to make the acid a highly efficient catalyst for the dehydrating and oxidizing procedures mentioned above, the specific type of tungstic acid catalyst prepared by this process having the property of effecting substantially completely the desired conversion of the oil into a drying oil without adversely affecting the color or other characteristics of the oil and being easily removable from the oil after the conversion treatment.

Prior attempts to change castor oil into a drying oil suitable for coatings, more particularly the dehydration of castor oil for this purpose, have involved the use of various types of chemical substances as dehydration catalysts. For example, acid substances such as phosphoric acid, acid sulphates and activated acid earths and various metallic oxides such as, for example, tungsten oxide, have been used with some degree of success. A number of these catalysts are subject to the disadvantage of requiring relatively high temperatures for utilizing their catalytic function and most of them do not provide the desired dehydration efficiency with small amounts of catalyst. They are also subject to effecting undesired decomposition of the oil and producing side reactions that altogether yield a product commercially unacceptable.

In accordance with our invention we have found that yellow tungstic acid, particularly when prepared according to our process possesses substantially all of the desired characteristics of a catalyst for converting the castor oil into a drying oil and is not subject to the limitations that characterize the prior products. Our tungstic acid catalyst is characterized by the following desirable properties:

A. The catalyst is effective in producing a drying oil with a minimum acetyl value.

B. The catalyst favors dehydration and oxidation in the direction to form conjugated ethylene linkages which are characteristic of the drying oils, such as China-wood oil.

C. The catalyst produces an oil having a low viscosity when dehydration is nearly complete.

D. The catalyst causes negligible undesired decomposition of the oil and effects an oil of relatively low acidity.

E. The catalyst does not impart adverse properties to the oil which become evident upon further processing or bodying, for example, darkening in color and considerable increase in acidity.

F. The spent catalyst is capable of satisfactory removal from the oil and regeneration into its original active form.

G. The catalyst effects smooth, uniform conversion of the oil and does not cause any excessive or violent reaction. It insures good control of the process in a minimum time.

H. The catalyst is capable of converting the oil at atmospheric pressure, as well as in vacuo, thereby providing flexibility of the conversion process.

I. A small quantity of the catalyst is capable of effecting conversion of the oil in minimum time and at relatively low temperature, thereby insuring maximum efficiency in operative economy.

As compared with tungsten oxide and generally with the commercially available catalysts, we have discovered that our yellow tungstic acid, $H_2WO_4$ catalyst prepared according to our process possesses properties approaching the ideal catalyst and these properties are governed largely by the manner in which the tungstic acid is prepared. By comparison with other catalysts, our catalyst effects a substantially higher degree of conversion of the castor oil into a drying oil. For example, conversions of 96%–98% have been uniformly obtained as compared with the usual 80–90% conversion effected by other catalysts; and the conversion reaction with this catalyst may be carried out equally efficiently in open or vacuum equipment, although the latter is generally preferred because it facilitates the removal of the water produced.

The yellow tungstic acid catalyst of our invention may be prepared in several ways, usually involving precipitation from its calcium or sodium salt with nitric acid or a mixture of nitric and hydrochloric acids. The concentration ratios of the acids, temperature, type of tungsten salt and method of addition of the reactants determines the particle size and reactivity of the tungstic acid as a conversion catalyst. When the precipitation reaction is caused to proceed very slowly, granular, dense, hard, particles of tungstic acid are formed, whereas a rapid precipitation forms very light dust-like particles of tungstic acid which are difficult to remove from the oil after dehydration.

We have found it advantageous to prepare the tungstic acid catalyst in finely divided particle size, although not so light and powdery that it cannot be easily removed from the oil after the conversion reaction. The following example illustrates the preparation of a fine, efficient form of catalyst which will effect the desired conversion of the oil with a high degree of efficiency and which can be readily removed from the oil.

Example I

| | Parts |
|---|---|
| Calcium tungstate | 25 |
| Concentrated nitric acid | 70 |
| Concentrated hydrochloric acid | 60 |
| Water | 100 |

Procedure: The calcium tungstate, preferably dry, is gradually added to the mixture of acids at 20° C. with rapid agitation. The addition is generally completed in 15 to 20 minutes. At the end of this period the mixture is gradually warmed to 50°-60° C., which process converts the white tungstic acid and any remaining unreacted calcium tungstate to the yellow tungstic acid.

The precipitate is permitted to settle out and the clear liquid decanted therefrom and used in the precipitation of the next batch. The precipitate is washed five times with 200 parts each of water, and dried in a dark chamber. The dried tungstic acid has the following characteristics which distinguish it from the usual commercially available tungstic acid and which render it particularly suitable for use in the conversion of castor oil into a drying oil.

Our tungstic acid is substantially free of the objectionable impurities that generally characterize the commercial forms of acids. For example, one of the commercial forms of acid smells strongly of NOCl, aqua regia; and another liberates ammonia in large quantities when treated with caustic. Aside from other disadvantages these impurities cause the oil to darken in our process. The particle size and density of our tungstic acid is relatively intermediate the coarse and very fine commercial types. As compared with a coarse grade of commercial acid, our acid possesses 75% through a 250 mesh screen and 70% through a 300 mesh screen as compared with 57% and 38% respectively of the commercial acid. Another form of commercial acid was so light and fine as not to be subject to screen analysis. Our especially prepared acid of a form intermediate these commercial types has been found to be much superior as a catalyst in the dehydrating process.

The following example illustrates the preparation of a fine, light powdery tungstic acid which is an efficient dehydration catalyst, but which is somewhat more difficult to remove from the oil than the catalyst described above in Example I. This catalyst nevertheless, may be used and its removal from the oil effected by the addition of suitable coagulating agents.

Example II

| | Parts |
|---|---|
| Solution A: | |
| Sodium tungstate | 20 |
| Water | 50 |
| Solution B: | |
| Con. hydrochloric acid | 48 |
| Con. nitric acid | 56 |
| Water | 50 |

Procedure: Solution B is heated to 95° C. and solution A is added rapidly with vigorous stirring. The temperature is maintained at 90°-95° C. for 10 minutes and then the precipitate is permitted to settle. The precipitate is washed about 5 times with 300 parts each of water by decantation until it becomes colloidal. At this point it is necessary to continue the washing and centrifuging one more time. If the colloidal solution will not break at this stage, the addition of a few crystals of ammonium nitrate will facilitate the precipitation.

The ease of filtration of the catalyst from the oil depends primarily upon its method of manufacture and difficulty is experienced if the catalyst is very fine and light in structure. For removing a catalyst of this form, a fine grade of filter aid such as "Supercel" may be used to remove the last traces. The use of filter aid complicates somewhat the recovery of our catalyst and for that reason we prefer to prepare the catalyst according to Example I above which does not require filter aid.

A very fine, particle size catalyst can be dispersed or dissolved in the treated oil in such a fine state of sub-division that particles cannot be filtered out with filter aid. Such particles may be coagulated by the addition of small quantities of ammonium salts or substituted ammonium salts, and application of relatively high heat. Such treatment usually causes the particles to coagulate and descend to the bottom of the vessel so that they may be separated from the oil. Normally these types of catalysts are substantially less desirable than the catalyst described above under Example I.

Another form of the tungstic acid catalyst which is not as efficient as the catalyst of Example I above, but which may, nevertheless, be used, and certain of the benefits of this invention derived, is a coarse, granular, dense tungstic acid. It may be made as follows:

Example III

| | Parts |
|---|---|
| Sodium tungstate crystals | 20 |
| Concentrated nitric acid | 21 |
| Water | 200 |

Procedure: The concentrated nitric acid is poured over the sodium tungstate crystals which are insoluble in this acid at room temperature. Several portions of about 5 parts each of water are added to this mixture causing the salt to become more soluble and then decomposed into a white tungstic acid which is gradually converted to the yellow acid. Small portions of water are added until all the sodium tungstate crystals are dissolved as judged by stirring the mixture. The remaining quantity of water is added and the mixture is gradually warmed to about 50° C. to insure complete conversion to the yellow tungstic acid. The precipitate is filtered and washed with 6 portions of 200 parts each of water, and then dried in vacuo at room temperature.

It is sometimes desirable to prepare the tungstic acid on an inert supporting medium and the following is an example of such a process wherein the acid is deposited on asbestos fibers:

Example IV

| | Parts |
|---|---|
| Asbestos fibers | 75 |
| Solution A: | |
| Saturated solution of sodium tungstate in water | |
| Solution B: | |
| Concentrated nitric acid | 56 |
| Concentrated hydrochloric acid | 48 |
| Water | 50 |

The asbestos fibers are soaked in sufficient saturated solution of sodium tungstate (solution A) to cover them. After thoroughly soaking, the wet fibers are placed in solution B at 90°. The yellow tungstic acid is then precipitated on the fiber surface. The fibers are removed after 15 minutes and thoroughly washed with water and dried. The dried fibers usually acquire a quantity of tungstic acid equal to about 30% of their original weight. This quantity increase can be determined by titration of tungstic acid directly with KOH, or determining the increase in weight of the fibers.

We have discovered that the method of drying tungstic acid prior to use is important. After thoroughly washing the tungstic acid after precipitation, the acid is dried preferably at low temperatures, i. e. not higher than about 100° F. in the open or in vacuo. Or, the acid may be washed with a solvent, e. g. alcohol in one of its denatured forms to remove the water. Drying the tungstic acid at relatively high temperatures such as 200° F. to 220° F. results in a dead and inactive catalyst. For industrial procedures, washing with alcohol has proven satisfactory. Since the yellow tungstic acid is light sensitive, it is advisable to evaporate the alcohol entrained in the press cake spontaneously in a darkened chamber or room.

The yellow tungstic acid prepared by any of the processes described above, and preferably by that of Example I is a distinctly different material, and functions in a distinctly different manner from the tungstic oxides including the blue tungsten oxide and the yellow tungstic oxide $WO_3$. The tungstic oxide compounds will for example, dehydrate castor oil only partially even at temperatures above 280° C. and even then with considerable decomposition of the oil. Structurally, the yellow tungstic acid $H_2WO_4$, used in our invention is a distinctly different compound from the yellow tungstic oxide $WO_3$, and the blue tungsten oxide, as indicated by data taken from X-ray powder diagrams which we have made. Using copper K alpha X-radiation sharp lines were found at different points for the acid and oxides as follows, given as "d" spacings in Angstrom units:

| Blue tungsten oxide | $WO_3$ tungstic oxide | $H_2WO_4$ tungstic acid |
| --- | --- | --- |
| 3.735 | 3.73 |  |
| 2.648 |  | 3.45 |
| 2.52 | 2.58 |  |
| 2.35 |  | 2.53 |
|  | 2.17 |  |
|  |  | 1.96 |
| 1.879 | 1.81 | 1.83 |
|  |  | 1.7 5 |
| 1.669 | 1.63 | 1.62 |
| 1.502 | 1.48 | 1.50 |
| 1.332 |  | 1.4 5 |
|  | 1.235 |  |
|  | 1.17 |  |
|  | 1.12 |  |

Chemically, the yellow tungstic oxide and tungstic acid can be differentiated by neutralization with a standard base. The oxide dissolves very slowly compared with the acid. The oxide was found to have a neutralization equivalent of 116.3 while that of the acid was 123.5; theoretically these values are 116 and 125 respectively.

The tungstic acid that we use in our process undergoes a chemical change during the conversion of the castor oil into the drying oil, namely, a reduction of the acid into a blue acid or blue tungsten oxide discussed above. This blue compound may be filtered out of the dehydrated oil and as such is not suitable for use in our invention. This tungsten oxide, however, may be reconverted into the yellow tungstic acid which we use, by either one of the following two methods:

The blue compound is roasted in air or oxidizing atmosphere to convert it to the higher valent yellow oxide, $WO_3$. This oxide is dissolved in the stoichiometric quantity of sodium or potassium hydroxide solution, as about a 25% solution, and permitted to stand. Usually, a small quantity of undissolved blue oxide together with other inert material settles out. Depending upon the temperature, sodium tungstate can crystallize out also. The clear solution is preferably decanted, and the sediment washed to remove and dissolve sodium tungstate. This solution is alkaline to litmus paper. Calcium tungstate is now precipitated from either a 25% solution of the chloride or acetate, based on the stoichiometric relationship and weight of the tungstic oxide used. We have found solutions of the concentrations mentioned to be most convenient for our type of equipment, but do not limit ourselves to these concentrations. The calcium tungstate is filter pressed and the press cake washed with water. We usually prefer to let the press cake air dry on trays, before precipitating the tungstic acid. This drying step is not essential, but is preferred.

In no case is it necessary to remove all the water from the cake; a correction being made in weighing the calcium tungstate. The calcium tungstate is decomposed with a mixture of nitric and hydrochloric acids. The ratio of calcium tungstate to concentrated nitric acid to concentrated hydrochloric acid to water can vary from 1:1:1:1 to 1:4:4:4 and any combination between these limits, although the preferred ratio is 1:2.8:2.2:4.

The decomposition of the calcium tungstate can take place at any temperature between 20° and 100° C., although the lower temperature is preferred, followed by a gradual rise. While the preferred salt is calcium tungstate, other insoluble and soluble salts can be used. The precipitated acid is filtered, thoroughly washed and dried, preferably by washing with alcohol, and then placed in a dark room at not more than 50° C. until either the water or alcohol, or both, have evaporated.

The second process is one of direct oxidation, in which nitric acid, potassium permanganate, or dichromates are used in acid mediums. This method of recovery involves the oxidation-reduction properties of yellow tungstic acid and tungsten trioxide. When either of these compounds is treated with zinc in hydrochloric acid it is reduced first, to a blue compound, blue black, purple, and chocolate brown. Starting with the yellow acid, $H_2WO_4$, the final product is undoubtedly the brown acid $H_2WO_3$, whereas the various colored products, as mentioned, are intermediates and perhaps mixtures of intermediate acids. The chocolate brown, or any one of the intermediate compounds can be readily oxidized back to the original yellow acid. Reduction and oxidation of these compounds can be controlled easily by governing the quantity of the reducing and oxidizing agents. In applying these principles to a blue compound filtered from our oils after conversion, we found that the blue compound would not oxidize directly back to the yellow acid. It was observed that it was not easily wetted by the oxidizing agents, but we have discovered a novel way of causing the compound to be wetted, as follows: It is first necessary to remove oil from the particles by the use of a suitable solvent, e. g. xylene and acetone and then make a thick slurry of the blue compound with a 10% ammonia solution. Sufficient hydrochloric acid to make the slurry acid to litmus is then added, followed by the addition of concentrated nitric acid and heating. After the precipitate acquires a yellow color, throughout its mass, the yellow tungstic acid is washed and dried in the usual manner as illustrated in our previous examples. A novel feature of this oxidation-recovery process, is that the particle size of the recovered yellow tungstic acid is the same as the original starting material. Likewise, the activity of the oxidized material is the same as the original for dehydration of castor oil.

The action of our yellow tungstic acid catalyst on castor oil to convert it into drying oil may be illustrated by the following discussion and subsequent examples; time temperature and quantity of catalyst being interdependent factors:

The composition of castor oil determines the composition of the converted oil. Castor oil is composed of about 85% ricinoleic acid, 10–12% oleic, linoleic and stearic acids, 2% dihydroxy acids and about 1% to 2% unsaponifiable matter. The acid which undergoes the change is the ricinoleic acid, an 18 carbon atom acid with a double bond at the 9–10 position and a hydroxyl group on the 12th carbon atom. Structurally it is as follows:

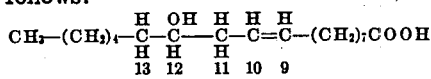

When the possibilities of dehydrating this part of the oil molecule are considered, it is obvious from inspection that the removal of water can proceed either between the 12 and 13 carbon atoms or between the 12 and 11 carbon atoms. In other words, the OH on the 12C can unite with an H from either the 11 or 13 carbon atoms. In the former an isomer of linoleic acid will be formed, i. e., a 9–12 diene acid, whereas, in the case of the latter a 9–11 diene, conjugated acid will form. To distinguish the difference between these acids, their reactivity with maleic anhydride and boron fluoride can be used as a criterion. An oil composed of the 9–11 diene acid possesses conjugated ethylene linkages, and reacts very readily when heated with maleic anhydride at 125°–130° C. when the color bleaches slightly with an abrupt rise in temperature to 145°–150° C., thus indicating a reaction. Upon cooling to 110° the mass forms a gel. When this same oil is treated with a small quantity of an ether solution of boron fluoride at room temperature the temperature rises slightly and the oil becomes more viscous.

Under the same conditions, oils with non-conjugated ethylene linkages do not react with either maleic anhydride or boron fluoride.

Inasmuch as an oil of the dehydrated castor oil type has virtues which make it useful as replacement for China-wood oil in varnishes, for linseed oil in house paints, for modifying alkyd resins, for non-yellowing baking enamels and related products, it is absolutely imperative that it be thoroughly or nearly 100% dehydrated and possess a viscosity as low as possible on the Gardner-Holdt scale. Thorough dehydration is necessary and essential to avoid syneresis of the film or the development of an "after-tack" in products in which it is used. An oil dehydrated to an acetyl number of 30, which represents a dehydration of 75–80% will dry to a good film in 2 to 3 hours with drier, but upon ageing, it will become very tacky in about 5 to 7 days. Because a poorly dehydrated oil possesses free hydroxyl groups, it in itself, or products made from it have poor water and alkali resistance. It is, therefore, quite obvious that the degree of dehydration determines the quality of the products in which this oil is used. For this reason even under present high China-wood oil prices, the various dehydrated castor oils available have not found general acceptance up to the advent of our oil.

A low viscosity oil is essential in the preparation of alkyd resins made by the alcoholysis process. When the initial viscosity of the dehydrated oil is E on the Gardner-Holdt scale it has been found that a shorter alkyd resin can be made than when an oil with a viscosity of G to H on the Gardner-Holdt scale is used. The above difference in viscosity, i. e., the difference between E and H requires the difference between 55% and 58% oil modification. This difference of 3% in oil length alters the properties of alkyd resin in viscosity, hardness, durability, etc. A low viscosity oil is also essential for house paint formulation.

In this connection we have discovered that viscosity and degree of dehydration are dependent variables. We have discovered that oils made with our catalyst and having a viscosity of E on the Gardner-Holdt scale are about 96–98% converted based on acetyl determinations; whereas an oil made with tungstic oxide catalyst and having a viscosity of K on the Gardner-Holdt scale, provided the acid number is low, is about 80% converted.

During the process of converting the castor oil the yellow tungstic acid suffers a reduction, being converted to a blue tungsten oxide, as pointed out above. There is some doubt as to the valence of tungsten in this product, although it is probably 5 instead of 6, as in the yellow tungstic acid. Also, the quantity of catalyst used in our process is not stochiometrically equivalent to any direct oxidation which the oil might undergo. In view of these facts we believe that the conversion process of our invention is not simply and truly one of dehydration, as is found evident in the case of the prior dehydration catalysts such as bisulphates, acid phosphates or metallic oxides, but rather one of oxidation through a set of reactions as explained more fully by the following discussion, which is substantially theoretical, and which is not intended to limit our invention.

We have reason to believe that the hydrogen atoms on the 11 and 13 carbon atoms adjacent to the 12 carbon atom to which the hydroxyl group is attached would possess a reactivity different from those on the remaining carbon atoms of the fatty acid chain. On this basis we feel that oxidation can take place on either or both the 11 and 13 carbon atoms, with this condition being favored on the 11 carbon atom, with a corresponding reduction of the yellow tungstic acid,

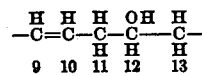

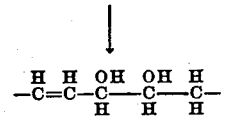

or, also on 13 carbon atom. These oxidation products are believed to exist only momentarily in the presence of our tungstic acid and break down into the following,

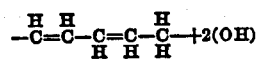

which also exists for a short period. Free hydroxyl radicals then exist in the oil at all times also until conversion is complete. These in turn can react to regenerate oxygen, thus

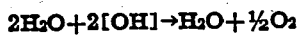

which in turn starts another cycle in the presence of tungstic acid. Toward the end of the reaction, the dilution of fatty oil glycerides containing the ricinoleic acid radicals increases by virtue of an ever increasing number of fatty oil molecules of an octadecadiene fatty acid. While the hydroxyl groups are continually being regenerated they do not in turn reoxidize the tungstic acid, but instead tend more fully to oxidize the small amount of decomposition products, or escape as water and oxygen. The yellow tungstic acid therefore merely acts as a promoter for this reaction by intimately yielding a small amount of oxygen to the castor oil. While we feel that the conversion of castor oil is a chain reaction, indicated by evidence which we have, we do not wish to be bound by this mechanism, but wish merely to advance it as explanation in support of our process.

The conversion of castor oil can be achieved in a batch or in a continuous process. In the former, the process can be conducted in open kettles, in vacuum equipment or in solvent, while in the latter process, the oil can be made to flow through a heated tower packed with some suitable catalyst bearing medium as asbestos fibers, etc.

As previously mentioned, the time of and temperature of conversion are somewhat interdependent. When a low temperature, i. e. 240° C. is maintained for conversion more catalyst than that required at 260° C. to achieve the same end is necessary. However, this is not exactly the case since we have discovered that as conversion proceeds the temperature must be raised to force the reaction to completion. Likewise an increase in temperature and higher percentages of catalyst diminish the time for the reaction to reach completion. Accordingly, we have found temperatures from 225° C. to 305° C. to be effective with 0.5% to 1.25% tungstic acid (based on the oil) to effect very nearly complete conversion within 40 to 60 minutes.

Of the batch processes, the conversion in vacuum is to be preferred. In this instance the preferred procedure is to add the catalyst to the oil at 240° C. with rapid agitation, and apply the vacuum in such fashion that the oil does not foam out of the container. The temperature is gradually raised to 250° C. in 30 minutes, and then 265° C. or 275° C. in the next 30 minutes. The final vacuum is usually around 5 millimeters at the end of this period. These pressures are merely cited and are not limiting. From observations made during the process the reaction is usually complete in 40 minutes.

In the case of open kettle procedure, the temperature control and time of reaction are identical. However, while both oils appear to be equally well converted the open kettle oil usually has an acid number higher than the vacuum converted oil. After conversion is considered complete, the oil is cooled to 200° and filter pressed. Unless a very fine grade of yellow tungstic acid is used, filter aid is unnecessary. If the catalyst is prepared according to Example I, no filter aid is needed.

Ordinarily it is necessary to prebody the converted castor oil to about Z-3 on the Gardner-Holdt scale, prior to use in varnishes, etc. This process usually requires at least two hours starting with an oil with a viscosity of E on the Gardner-Holdt scale. The batch process procedures can also be so modified that dehydration and bodying can be achieved simultaneously.

In this connection we have discovered that conversion and bodying can be achieved within a total of two hours. The catalyst which may vary from about .6 to 1% of the weight of the oil is added to the oil at about 240° and the temperature is then raised to 305° C. as rapidly as possible. This naturally depends upon the volume of material used. Usually two hours after 305° C. is reached both processes are complete; the oil is cooled to below 200° C. and filter-pressed hot to remove the catalyst. Hot filtration is essential because of the high viscosity of the oil.

In the accompanying drawing, Figure 1 shows two curves, A and B, that indicate the relationship existing between the degree of conversion and quantity of catalyst, with an active catalyst and an inactive catalyst, respectively other conditions being the same. The catalyst was introduced into the oil at 240° C. and the temperature raised to 250° C. in 30 minutes and then to 260° C. in the next thirty minutes, and then cooled to 150° C. Vacuum was applied when the catalyst was introduced reaching a final figure of 5 millimeters of mercury after one hour when the process was discontinued. Curve A shows the result of a fine active catalyst, while curve B shows the effect of a coarse inactive catalyst.

In the accompanying set of curves, Figure 2, the boiling points of solutions of castor oil in volatile thinners are shown. In low percentages of solvent the boiling points are sufficiently high for conversion. The apparatus used is so constructed that as conversion proceeds the water is distilled with the volatile solvent in such a fashion that both are condensed and the volatile solvent continuously returned to the system while the water which is heavier is trapped in a side arm well. The presence of the solvent necessarily modifies the procedure. An inspection of the curve C for xylene, indicates that a 5% solution of xylene and castor oil should reflux continuously at 243° C. The introduction of the catalyst at this temperature causes it to drop to about 220° when conversion starts. This temperature is too low for the conversion reaction; also a somewhat higher temperature for dehydration in the presence of solvent is necessary. Accordingly then, we distill a given quantity of solvent from the oil so that constant reflux at some given temperature obtains, which in this case we have found should be at least 290°. For xylene this represents 2%. The preferred procedure is to adjust the solvent-castor oil solution so that constant reflux at some temperature about 290° obtains when conversion is complete. When conversion is complete the quantity of water evolved represents between 93% and 100% of the theoretical which theoretical is 5% of the weight of the oil. In this instance the quantity of evolved water measures the completeness of the reaction.

We do not desire to remove the solvent from the oil, since we can body the oil as well as cook a varnish in the presence of solvent. This procedure is disclosed in a co-pending application, Serial No. 270,522, filed April 28, 1939 by Benjamin Rabin and Kenneth A. Earhart.

The following illustrative but non-limiting examples illustrate the application of the tungstic acid catalyst to castor oil in such a manner that the oil is dehydrated and oxidized as described above to effect its conversion into a drying oil suitable for use in coatings.

Example V

The following example illustrates the preparation of a castor oil converted in vacuo.

| | Parts |
|---|---|
| Castor oil | 100 |
| Tungstic acid (Example 1 above) | 1 |

Procedure: The oil was heated to 240° C. and the catalyst introduced. The vacuum was applied in such a manner that the oil did not foam out of the vessel. Together with vigorous agitation the temperature was raised to 260° C. in one hour when conversion was considered to be complete. The oil was cooled to 200° C. and filtered without the use of filter aid.

The oil had the following constants:

| | |
|---|---|
| Color | 7 (Gardner-Holdt 1933) |
| Viscosity | E (Gardner-Holdt 1933) |
| Refractive index | 1.4825 at 25° C. |
| Acetyl No | 6 |

Example VI

The following example illustrates the conversion of castor in the presence of a volatile solvent.

| | Parts |
|---|---|
| Castor oil | 1500 |
| Tungstic acid (Example I) | 20 |
| Mineral spirits | 45 |

Procedure: The oil and mineral spirits were heated with agitation in a flask equipped with a solvent return (Bidwell and Stirling type) side arm. When 240° was reached, the tungstic acid was introduced. Conversion begins immediately and finally reaches completion with constant refluxing at about 290° in 90 minutes. The oil is cooled to 200° and filter pressed. In this case 73 parts of water were evolved which represents conversion to the extent of 97%.

Example VII

The following example illustrates the preparation of a castor oil converted in open kettle.

| | Parts |
|---|---|
| Castor oil | 5000 |
| Tungstic acid (Example II) | 50 |
| Filter aid | 150 |

Procedure: The oil was heated to 240° C. and the catalyst was then added. The temperature was gradually raised to 250° C. over a period of an hour and then cooled to 200° C. when the filter aid was added. The oil was filter pressed and recirculated until clear.

The oil had the following constants:

| | |
|---|---|
| Color | 9 (Gardner-Holdt—1933) |
| Viscosity | F (Gardner-Holdt—1933) |
| Acid No | 10.5 |
| Refractive index | 1.4820 |

Example VIII

The following example illustrates the conversion of castor oil with tungstic acid precipitated on an inert non-reactive medium.

| | Parts |
|---|---|
| Castor oil | 100 |
| Tungstic acids precipitated on asbestos (Example IV) | 4 |

Procedure: The procedure followed is identical with that of Example V. The oil had the following constants:

| | |
|---|---|
| Color | 8 |
| Viscosity | E |
| Refractive index | 1.4828 |
| Acid value | 8 |

Example IX

The following example illustrates the preparation of a dehydrated castor oil by a continuous process.

Procedure: Castor oil is caused to flow down in a continuous current over asbestos fibers treated with tungstic acid as in Example IV held in a vertical reaction chamber which is heated to 240–250° C. The castor oil is preheated to 230°–240° and the flow adjusted by application of vacuum at the bottom of the chamber. The water of dehydration, the small quantity of decomposition products, and dehydrated oil drop in a chamber so constructed that the water and decomposition products distill off while the oil is collected in a vessel immediately below this separation chamber.

To make a bodied, dehydrated oil suitable for use as a high viscosity oil in varnishes, the following example is illustrative:

Example X

The dehydrated oil prepared as in Examples V, VII, VIII and IX, is heated to 304° C. and held for 2 hours when an oil with the following properties results:

| | |
|---|---|
| Viscosity | $Z_3$ on Gardner-Holdt scale |
| Color | 7 on Gardner-Holdt scale |
| Acid value | 15 |

When this same oil is heated in a vacuum of about 10 millimeters a greatly improved oil results, in which case the properties are:

| | |
|---|---|
| Viscosity | $Z_3$ |
| Color | 7 |
| Acid value | 6 |

This low acidity is very important since varnishes prepared from this oil show alkali and water resistance greatly superior to those prepared from oils in which the acidity is greater than 12.

It is to be understood that various changes and modifications may be made in the above described processes, conditions and materials, without departing from the scope of our invention, some of the novel features of which are defined in the appended claims.

We claim:

1. The process of dehydrating castor oil which comprises adding to the castor oil catalytic quantities of yellow tungstic acid corresponding to the formula $H_2WO_4$ prepared by precipitation with a strong acid from an alkaline solution of tungstic oxide, $WO_3$, and heating the mixture to a temperature of from about 225° C. to 305° C. until the tungstic acid turns blue and the oil is largely dehydrated.

2. A process as specified in claim 1 in which the catalyst amounts to between 0.5% and 1.25% of the weight of the oil.

3. A process as specified in claim 1 in which the catalyst used for treating one quantity of oil is subsequently reconverted to yellow tungstic oxide and used for treating additional oil.

ALFRED E. RHEINECK.
SAMUEL B. CRECELIUS.